(12) United States Patent
Englekirk (10) Patent No.: US 11,641,159 B1
(45) Date of Patent: May 2, 2023

(54) FAST DETECTION AND DISCHARGE FOR CHARGE PUMP CONTROLLER

(71) Applicant: pSemi Corporation, San Diego, CA (US)

(72) Inventor: Robert Mark Englekirk, Littleton, CO (US)

(73) Assignee: pSemi Corporation, San Diego, CA (US)

(*) Notice: Subject to any disclaimer, the term of this patent is extended or adjusted under 35 U.S.C. 154(b) by 0 days.

(21) Appl. No.: 17/527,970

(22) Filed: Nov. 16, 2021

(51) Int. Cl.
*H02M 3/07* (2006.01)
*H02M 1/00* (2006.01)

(52) U.S. Cl.
CPC ........... *H02M 3/07* (2013.01); *H02M 1/0045* (2021.05)

(58) Field of Classification Search
None
See application file for complete search history.

(56) References Cited

U.S. PATENT DOCUMENTS

| | | | | |
|---|---|---|---|---|
| 7,944,277 B1 * | 5/2011 | Sinitsky | ..................... | G05F 1/56 363/60 |
| 7,965,067 B2 * | 6/2011 | Gronthal | ................. | H02M 3/07 323/280 |
| 9,685,963 B2 * | 6/2017 | Englekirk | ............. | H02M 3/073 |
| 2013/0148456 A1 * | 6/2013 | Cho | ........................ | G11C 5/145 365/226 |

OTHER PUBLICATIONS

Robert Mark Englekirk, "Leakage Compensation Circuit", U.S. patent application filed in the USPTO on Aug. 6, 2021, U.S. Appl. No. 17/396,508, 25 pgs.

* cited by examiner

*Primary Examiner* — Jeffery S Zweizig
(74) *Attorney, Agent, or Firm* — Jaquez Land Greenhaus & McFarland LLP; John Land, Esq.

(57) ABSTRACT

Circuits and methods that can rapidly detect voltage degradation in a positive charge pump output and discharge control node accumulated charge (CNAC), thereby forcing the positive charge pump into a high-power mode. Embodiments include circuitry configured to provide a load current to a positive charge pump, including a low-dropout regulator (LDO) having a pass device that includes a control input, and a rapid charge transfer circuit coupled to the control input of the pass device and configured to be coupled to a source of a trigger voltage, the rapid charge transfer circuit configured to transfer a charge to or from the control input of the pass device when the trigger voltage falls sufficiently below a specified level so as to rapidly place the pass device in a higher conduction state, and to automatically cease to provide the transfer the charge after a settable amount of time.

17 Claims, 6 Drawing Sheets

FAST DETECTION AND DISCHARGE FOR CHARGE PUMP CONTROLLER

BACKGROUND

(1) Technical Field

This invention relates to electronic circuitry, and more particularly to positive charge pump control circuits.

(2) Background

Figure 1:
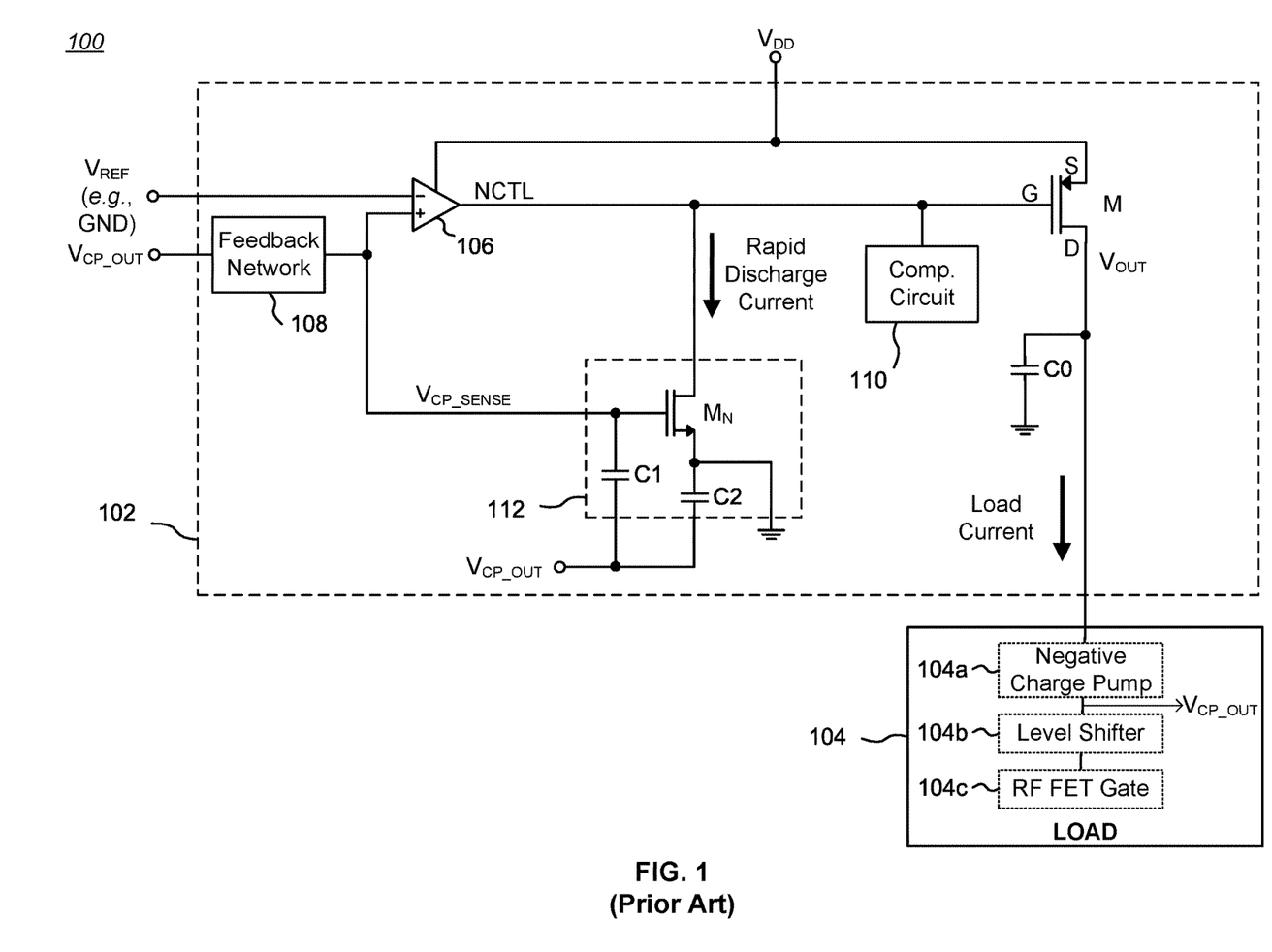
FIG. 1 is a block diagram and partial schematic of a prior art low-dropout regulator (LDO) configured to generate a regulated output voltage which can source current to a negative charge pump component of a load.

FIG. 1 is a block diagram and partial schematic 100 of a prior art low-dropout regulator (LDO) 102 configured to generate a regulated output voltage which can source current to a negative charge pump 104a, which is a component of a load 104. As is known in the art, an LDO is a DC linear voltage regulator that can regulate its output voltage $V_{OUT}$ even when its supply voltage $V_{DD}$ is very close to the output voltage.

In the illustrated example, the LDO 102 includes a pass transistor M (shown as a P-type MOSFET) configured to generate a regulated output voltage $V_{OUT}$ from an input voltage $V_{DD}$ and supply a load current to a negative charge pump 104a which may be configured for different applications to output a voltage $V_{CP\_OUT}$ that is negative with respect to its input voltage, $V_{OUT}$, provided by the LDO 102. The negative charge pump 104a is coupled in this example to a level shifter 104b, which translates an input signal from one voltage range to another voltage range in known fashion. Continuing this example, the translated output of the level shifter 104b is coupled to the gate of an RF FET 104c (which may be a MOSFET) configured as a switch to block or conduct an RF signal. As should be clear, the load 104 may comprise other and/or different circuitry that benefits from the regulated voltage output of an LDO 102.

The pass device M has a control input—gate G—controlled by an error amplifier 106 which compares a reference voltage $V_{REF}$ (which typically would be circuit ground) to the output of a feedback network 108 coupled to $V_{CP\_OUT}$ from the negative charge pump 104a. The feedback network 108 may be, for example, a resistive divider network that provides a scaled version of $V_{CP\_OUT}$ to one input of the error amplifier 106.

A frequency compensation circuit 110 may be provided to compensate the control loop and to control overshoot and ringing in the step response of the error amplifier 106. A decoupling capacitor C0 filters noise from the output of the LDO 202 and provides a charge reservoir for smoothing that output.

A trend in the industry is that charge pumps are being required to operate at lower and lower current levels (e.g., <16 μA), yet must be able to supply more and more current to discharge the body current $I_{SS}$ from an RF switch during RF transmissions (e.g., $I_{SS} \geq 75$ μA). In order to meet these operation requirements, the LDO 102 must also operate at very low current. As a consequence, the error amplifier 106—which controls the output voltage $V_{OUT}$ of the LDO 102—must operate at very low current, which generally means that the error amplifier 106 is very slow to respond to a sudden change in load current required by load 104.

Reducing the current in the error amplifier 106 adversely affects its current sink capability, resulting in a very slow response time with respect to changes in the load current of the LDO 102 that drop the output voltage of the negative charge pump 104a below its designed output level. Such changes may occur, for example, when an RF FET 104c is turned OFF. A slow response time for the error amplifier 106 means that the switching time of a coupled RF FET is degraded.

In greater detail, a major cause of slow response in a slow error amplifier 106 is its limited ability to discharge the gate of the pass device M. Referring to FIG. 1, an output control signal NCTL is coupled by a control line from the output of the error amplifier 106 to the gate of the P-type pass device M. If $V_{DD} \approx +1.8V$, then when NCTL=0V, the pass device M is forced fully ON (since the $V_{GS}$ is more negative than the threshold voltage $V_{TH}$ of this specific device). When the current demanded by the load 104 is very low or zero, the error amplifier 106 will force the voltage on NCTL such that the difference between NCTL and $V_{DD}$—i.e., the $V_{GS}$ of pass device M—becomes more positive, approaching $V_{TH}$ and perhaps even exceed $V_{TH}$, such that the pass device M conducts little to no current. In such a scenario, where the current demanded by the load 104 is very low or zero, and the gate voltage of pass device M rises towards $V_{DD}$, a charge builds up on the gate G of the pass device M. In addition, charge builds up on parasitic capacitances (including all of the components of the frequency compensation circuit 110, which often includes designed-in capacitors, and Miller effect capacitance) coupled to the connection between the error amplifier 106 and the gate G of the pass device M. Accordingly, in order to increase current conduction through pass device M, such as in the case where the load 104 demands high current, the accumulated charge (gate and parasitic)—or Control Node Accumulated Charge (CNAC)—must be discharged. While a conventional error amplifier 106 can discharge the CNAC, it will do so relatively slowly, thus limiting the response time of the LDO 102 and consequently limiting the switching time of a coupled RF FET.

When the load includes a negative charge pump 104a, it has been known to use an application-specific rapid discharge circuit to quickly discharge the CNAC on the NCTL control signal line. Referring to FIG. 1, a rapid discharge circuit 112 comprises an N-type MOSFET $M_N$ coupled between the NCTL control signal line and circuit ground. The gate of MOSFET $M_N$ is coupled to a scaled voltage, $V_{CP\_SENSE}$, derived from $V_{CP\_OUT}$ from the negative charge pump 104a. For purposes of providing better noise and crosstalk immunity, an additional first capacitor C1 is coupled between the gate of MOSFET $M_N$ and $V_{CP\_OUT}$, and an additional second capacitor C2 is coupled between the source of MOSFET $M_N$ and $V_{CP\_OUT}$. The source of MOSFET $M_N$ is also coupled to circuit ground. If $V_{CP\_SENSE}$ changes quickly, as when an RF FET gate is charged to switch states, then the voltage at the gate of MOSFET $M_N$ will exceed the $V_{TH}$ of the device and MOSFET $M_N$ will conduct. Once MOSFET $M_N$ is triggered ON, the NCTL control line is coupled to circuit ground, thus rapidly discharging the CNAC. As a result, the pass device M will begin to conduct and fully power on the negative charge pump 104a. Once $V_{CP\_OUT}$ (and thus $V_{CP\_SENSE}$) is restored to its designed voltage level, then MOSFET $M_N$ will turn OFF. With MOSFET $M_N$ OFF, the error amplifier 106 output will again control the NCTL control line and the gate G of the pass device M. Overall, the response time of the LDO 102 is improved.

Unfortunately, the rapid discharge circuit 112 simply will not work with a positive charge pump since the polarity of $V_{CP\_OUT}$ is reversed and accordingly MOSFET $M_N$ will not turn ON when $V_{CP\_OUT}$ droops.

Accordingly, there is a need for a discharge circuit for Control Node Accumulated Charge that can rapidly detect voltage degradation in a positive charge pump output and force the positive charge pump into a high-power mode. The present invention addresses this need.

SUMMARY

The present invention encompasses circuits and methods that can rapidly detect voltage degradation in a positive charge pump output and discharge Control Node Accumulated Charge (CNAC), thereby forcing the positive charge pump into a high-power mode.

Embodiments include circuitry configured to provide a load current to a positive charge pump, including a low-dropout regulator (LDO) having a pass device that includes a control input, and a rapid charge transfer circuit coupled to the control input of the pass device and configured to be coupled to a source of a trigger voltage derived from the output of the positive charge pump, the rapid charge transfer circuit configured to transfer a charge to or from the control input of the pass device when the trigger voltage falls sufficiently below a specified level so as to rapidly place the pass device in a higher conduction state, and to automatically cease to provide the charge transfer after a settable amount of time.

Embodiments include variations in which the pass device is a PFET device or an NFET device.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods that can rapidly detect voltage degradation in a positive charge pump output and discharge Control Node Accumulated Charge (CNAC), thereby forcing the positive charge pump into a high-power mode.

PFET-Based Embodiments

Figure 2:
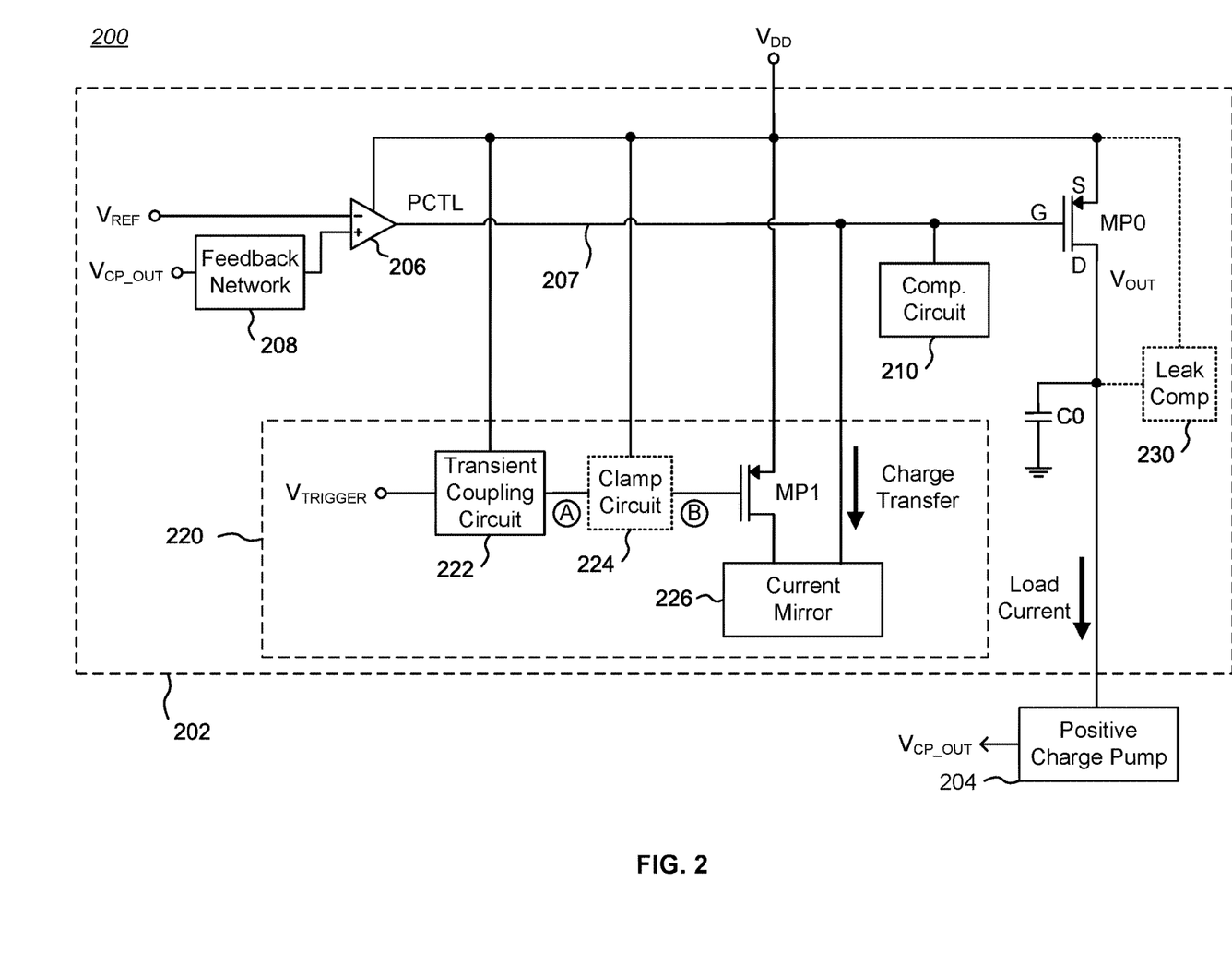
FIG. 2 is a block diagram and partial schematic of an improved PFET-based linear regulator comprising a low-dropout regulator (LDO) configured to provide a load current to a charge pump.

FIG. 2 is a block diagram and partial schematic 200 of an improved PFET-based linear regulator comprising a low-dropout regulator (LDO) 202 configured to provide a load current to a charge pump 204. In the illustrated example, the charge pump 204 is a positive charge pump. Not shown is other circuitry that may be coupled to the charge pump 204, such as a level shifter 104b and RF FET gate 104c.

In the illustrated example, the LDO 202 includes a pass transistor MP0 (shown as a P-type MOSFET, or "PFET") configured to generate a regulated output voltage $V_{OUT}$ from an input voltage $V_{DD}$ and supply a load current to the positive charge pump 204. The positive charge pump 204 outputs a positive voltage $V_{CP\_OUT}$ relative to the voltage $V_{OUT}$ provided by the LDO 202. The positive charge pump 204 is generally coupled to other circuitry (not shown), such as a level shifter coupled to the gate of an RF FET configured as a switch to block or conduct an RF signal. As should be clear, the output of the positive charge pump 204 may be coupled to other and/or different circuitry.

The pass device MP0 has a gate G controlled by an error amplifier 206 which compares a reference voltage $V_{REF}$ to the output of a feedback network 208 coupled to $V_{CP\_OUT}$ from the positive charge pump 204. The feedback network 208 may be, for example, a resistive divider network that provides a scaled version of $V_{CP\_OUT}$ to one input of the error amplifier 206. An output control signal PCTL from the error amplifier 206 is coupled by a control line 207 to the gate of the P-type pass device MP0.

A frequency compensation circuit 210 may be provided to compensate the control loop and to control overshoot and ringing in the step response of the error amplifier 106. A decoupling capacitor C0 filters noise from the output of the LDO 202 and provides a charge reservoir for smoothing that output.

If $V_{DD} \approx 1.8V$, then when PCTL=0V, the pass device MP0 is forced fully ON (since the $V_{GS}$ is more negative than the threshold voltage $V_{TH}$ of this device). When the difference in voltage between PCTL and $V_{DD}$ shrinks sufficiently so as to become more positive than $V_{TH}$, the pass device MP0 will turn OFF. As the gate voltage to the pass device MP0 rises, CNAC builds up on the gate G of the pass device MP0. Accordingly, in order to turn the pass device MP0 back ON, the CNAC must be discharged. While a conventional error amplifier 206 can discharge the CNAC, it will do so relatively slowly, thus limiting the response time of the LDO 202.

To remedy the response problem caused by CNAC, embodiments of the present invention include a rapid charge transfer circuit 220 coupled to the control line 207 between the error amplifier 206 and the gate G of the pass device MP0. When triggered by a voltage drop on the output of the positive charge pump 204, the rapid charge transfer circuit 220 quickly provides a discharge current that pulls the control line 207 to a reference potential (e.g., circuit ground) and thus discharges the CNAC. The rapid charge transfer circuit 220 automatically ceases to provide the discharge current after a settable amount of time.

In the illustrated example, the rapid charge transfer circuit 220 includes a transient coupling circuit 222 designed to pass a desired range of frequencies. The transient coupling circuit 222 is coupled to $V_{DD}$ and to a second input voltage $V_{TRIGGER}$ (e.g., ~3.4V to ~4V). In some embodiments, the transient coupling circuit 222 may be a high-pass filter. $V_{TRIGGER}$ may be coupled to one of multiple possible sources, such as the output $V_{CP\_OUT}$ of the positive charge pump 204 or a signal derived from the output of the positive charge pump 204 (e.g., through a resistive divider network, which may be the illustrated feedback network 208, and/or through a filter circuit). The output of the transient coupling circuit 222 is coupled to the gate of a P-type MOSFET MP1, either directly or through an optional clamp circuit 224. The source of MP1 is coupled to $V_{DD}$ and the drain of MP1 is coupled to a current mirror 226. The current mirror 226 is also coupled to the control line 207.

While $V_{TRIGGER}$ is within a normal operational range (e.g., ~3.4V to ~4V), nodes A and B will both nominally be at $V_{DD}$, for example, ~1.8V (note that nodes A and B are the same location if the optional clamp circuit 224 is omitted). However, if $V_{TRIGGER}$ quickly slumps, then nodes A and B will also decrease in voltage towards zero. If the voltage slump at nodes A and B is more than the threshold voltage $V_{TP}$ of MP1 below the nominal value of $V_{TRIGGER}$, then MP1 will turn ON and conduct current into the current mirror 226. As a consequence, the current mirror 226 will conduct a discharge current through the current mirror's output terminal that pulls the control line 207 to circuit ground and thus rapidly discharges the CNAC.

The transient coupling circuit 222 may be a simple RC circuit, as described below with respect to FIG. 3. The transient coupling circuit 222 is configured such that, within a short time determined by its RC time constant (e.g., a few micro-seconds), nodes A and B recharge to $V_{DD}$ and consequently automatically turn MP1 OFF. With the rapid discharge of the CNAC, the pass device MP0 will be in a higher conduction state, and the PCTL signal from the error amplifier 206 will again control the gate G of the pass device MP0. Overall, the response time of the LDO 202 is significantly improved.

The optional clamp circuit 224, also coupled to $V_{DD}$, limits the voltage difference between $V_{DD}$ and the voltage at node B to ensure that the gate voltage for MP1 is not outside an acceptable range for device reliability.

The LDO 202 may include an optional leakage compensation circuit 230. The function of the leakage current compensation circuit 230 is to generate a current that counteracts the leakage current through the pass device MP0 of the LDO 202 during conditions that induce such leakage. More specifically, the leakage current compensation circuit 230 can replicate the leakage current of the pass device MP0 of the LDO 202 and feed a compensating current to the output of the LDO 202 from a current mirror circuit while drawing almost no power during normal use, when leakage current is negligible. Further details of a suitable leakage compensation circuit 230 are disclosed in U.S. patent application Ser. No. 17/396,508, filed Aug. 6, 2021, entitled "Leakage Compensation Circuit", assigned to the assignee of the present invention, the contents of which are incorporated herein by reference.

Figure 3:
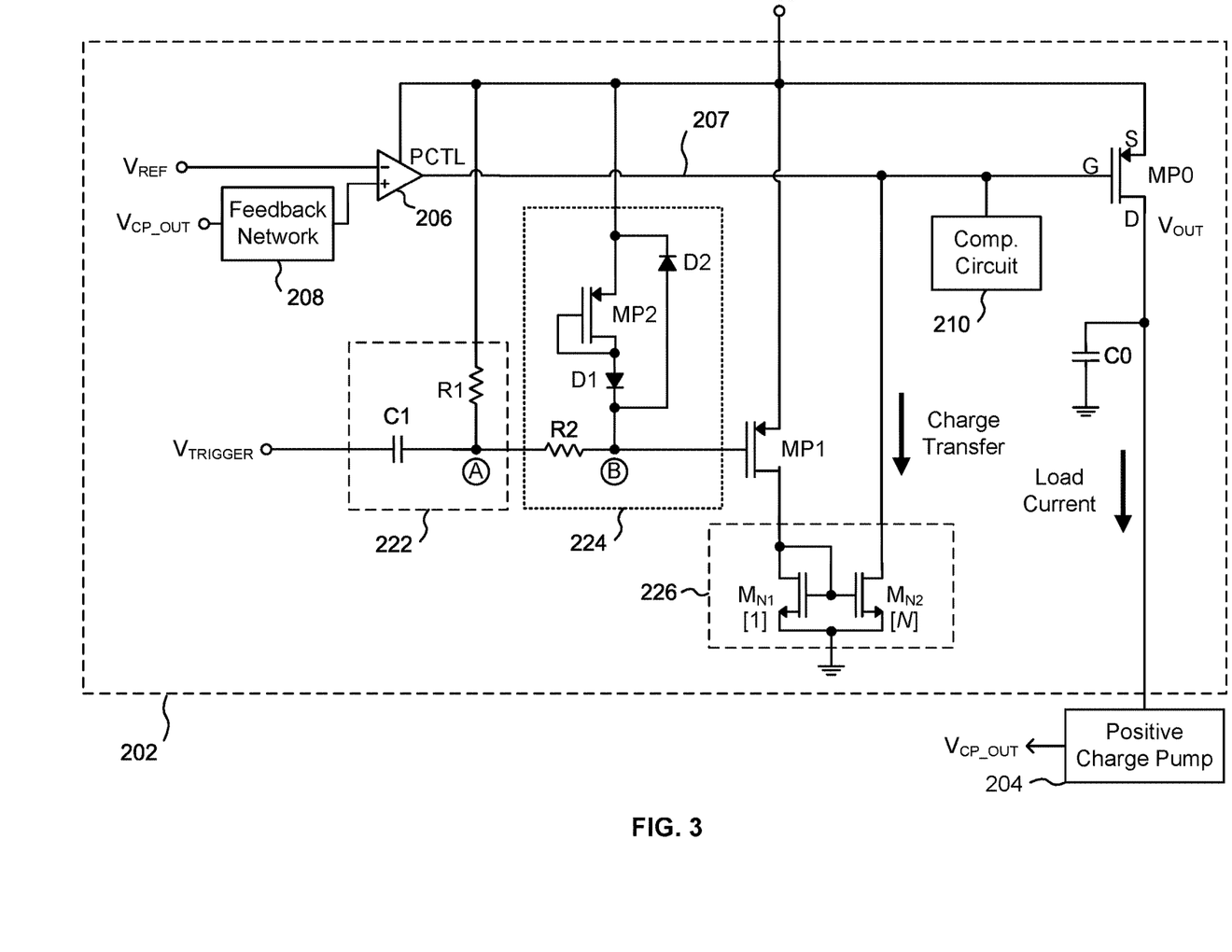
FIG. 3 is a block diagram and partial schematic of the circuit of FIG. 2 showing a detailed embodiment of the rapid discharge circuit.

FIG. 3 is a block diagram and partial schematic of the circuit of FIG. 2 showing a detailed embodiment of the rapid charge transfer circuit 220. The rapid charge transfer circuit 220 includes detailed example circuits for the transient coupling circuit 222, the optional clamp circuit 224, and the current mirror 226. To avoid clutter, the optional leakage compensation circuit 230 is omitted.

The illustrated transient coupling circuit 222 comprises a high-pass filter that includes a DC-blocking capacitor C1 coupled between the input voltage $V_{TRIGGER}$ and node A, and a resistor R1 coupled between $V_{DD}$ and node A. When node A is pulled low by a slump in $V_{TRIGGER}$, the RC time constant of the high-pass filter delays restoration of the $V_{DD}$ voltage at node A for a short time (e.g., a few micro-seconds) to enable current conduction through MP1 and full discharge of the control line 207 by the current mirror 226. The component values of the capacitor C1 and resistor R1 should generally be selected to allow sufficient time to discharge the CNAC but without un-necessarily delaying restoration of the $V_{DD}$ voltage at node A so that normal control by the error amplifier 206 prevails. As should be clear, the transient coupling circuit 222 may be implemented in other ways, including, for example, a band-pass filter.

The optional clamp circuit 224 includes a resistor R2 separating node A from node B, a diode-connected P-type MOSFET MP2 and diode D1 connected between $V_{DD}$ and node B (diode D1 cathode towards node B), and a diode D2 connected in parallel with MP2 and diode D1 between $V_{DD}$ and node B (diode D2 cathode towards $V_{DD}$). As should be appreciated, other clamp circuits known in the art may be used to perform the function of the clamp circuit 224.

The current mirror 226 generates a scaled copy of the input current. In the illustrated example, the current mirror 226 is configured to have a ratio of input current to scaled copied current (i.e., the discharge current) of 1:N.

The illustrated current mirror 226 includes an input N-type MOSFET $M_{N1}$ having its drain and gate coupled to the drain of MP1 and its source coupled to a reference potential, such as circuit ground. A mirror output N-type MOSFET $M_{N2}$ has its drain coupled to the control line 207 (and hence to the gate of the pass device MP0), its gate coupled in common with the gate of $M_{N1}$, and its source coupled to the reference potential.

In some embodiments, the input $M_{N1}$ and the mirror output device $M_{N2}$ are the same size, thus having a ratio of input current to output current of 1:1. In some embodiments, $M_{N2}$ may be larger or smaller than $M_{N1}$, such as 1:N (where N may be any floating-point number), and accordingly the current mirror 226 may be configured to have a ratio of input current to scaled output current of 1:N.

Without the rapid charge transfer circuit 220, the response time of an LDO would be delayed by the slew rate of the error amplifier 206 driving the CNAC resulting from the combined effective capacitance of the gate G of the pass device MP0 and the compensation network 210. For example, assume that the effective capacitance on control line 207 is about 1.3 pF, and the slew rate available current of the error amplifier 206 is ~0.5 µA. Assume that, to turn the pass device MP0 fully ON, the voltage at the gate of the pass device MP0 must be moved as much as ~1V (e.g., from 1.2V to 0.2V). Using the well-known formula for current through a capacitor, I=C*dV/dT, where I is current through a capacitance, C is capacitance (which in this case is the effective capacitance on control line 207), dV is the required voltage deviation on the capacitor, and dT is the time duration of the voltage deviation dV, then dT=C*dV/I. With the assumed values, dT=1.3 pF*1V/0.5 µA=2600 ns as the time duration to discharge the CNAC.

In contrast, one modeled version of the LDO 202 has a rapid charge transfer circuit 220 that exhibits a slew rate available current of 26 µA through the mirror current 226. With the same assumptions for effective capacitance and voltage differential, dT=1.3 pF*1V/26 µA=50 ns to discharge the CNAC, substantially shorter than the 2600 ns of an LDO without the rapid charge transfer circuit 220 but otherwise having similar parameter values.

NFET-Based Embodiments

Figure 4:
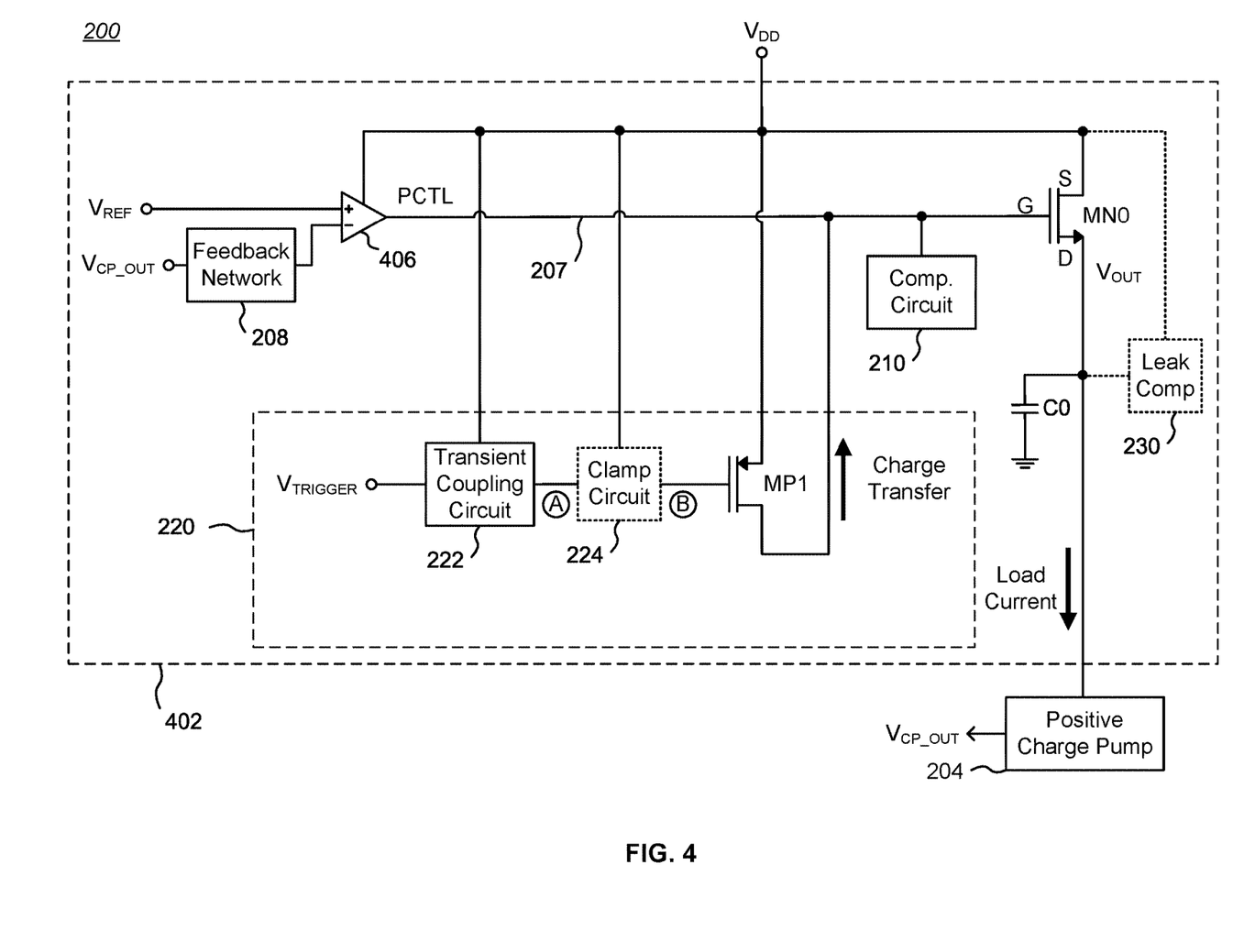
FIG. 4 is a block diagram and partial schematic of an improved NFET-based linear regulator configured to provide a load current to a charge pump.

While the examples shown in FIGS. 2 and 3 utilized a PFET MP0 as the pass device, the invention can be adapted for use with an NFET pass device. For example, FIG. 4 is a block diagram and partial schematic of an improved NFET-based linear regulator 402 configured to provide a load current to a charge pump. In most respects, the overall linear regulator 402 circuit is very similar the embodiments shown in FIGS. 2 and 3. However, the pass device MN0 is an NFET, and the polarity of the error amplifier 406 is reversed compared to the error amplifier 206 of FIGS. 2 and 3.

Another notable change is that the current mirror 226 of FIGS. 2 and 3 is omitted from the linear regulator 402 of FIG. 4. Instead, in the rapid charge transfer circuit 220, the drain of the P-type MOSFET MP1 is directly coupled to the control line 207. Accordingly, when the transient coupling circuit 222 passes occurrences of $V_{TRIGGER}$ to the gate of MP1, the control line 207 is coupled to $V_{DD}$, and accordingly charge is transferred to the gate of pass transistor MN0. The transient coupling circuit 222 is configured such that, within a short time determined by its RC time constant (e.g., a few micro-seconds), nodes A and B recharge to $V_{DD}$ and consequently automatically turn MP1 OFF. With the control input (gate) of the pass transistor MN0 having been rapidly charged by MP1, the pass device MN0 will be in a higher conduction state, and the PCTL signal from the error amplifier 206 will again control the gate G of the pass device MN0. Overall, the response time of the linear regulator 402 is significantly improved.

As should be clear, the transient coupling circuit 222 of FIG. 4 may be configured like the transient coupling circuit 222 of FIG. 3, or any equivalently functioning circuit. Similarly, the optional clamp circuit 224 of FIG. 4 may be configured like the optional clamp circuit 224 of FIG. 3, or any equivalently functioning circuit Circuit Embodiments Note that the regulated voltage output of the LDO 202 may be coupled to other and/or different circuitry that can trigger, and benefit from, a rapid discharge of CNAC on the control line 207 to the pass device MP0, and accordingly is not limited to use with a positive charge pump 204. Further, while the examples shown in FIGS. 2, 3, and 4 depict an LDO 202 or a specific linear regulator 402, the invention applies more generally to linear regulators. Moreover, the pass devices MP0, MN0 shown in FIGS. 2, 3, and 4 are PFETs or NFETs, the invention applies to other types of pass devices that exhibit similar Control Node Accumulated Charge characteristics, including (without limitation) bipolar and double-diffused metal-oxide-semiconductor (DMOS) transistor devices.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless RF communication.

Figure 5:
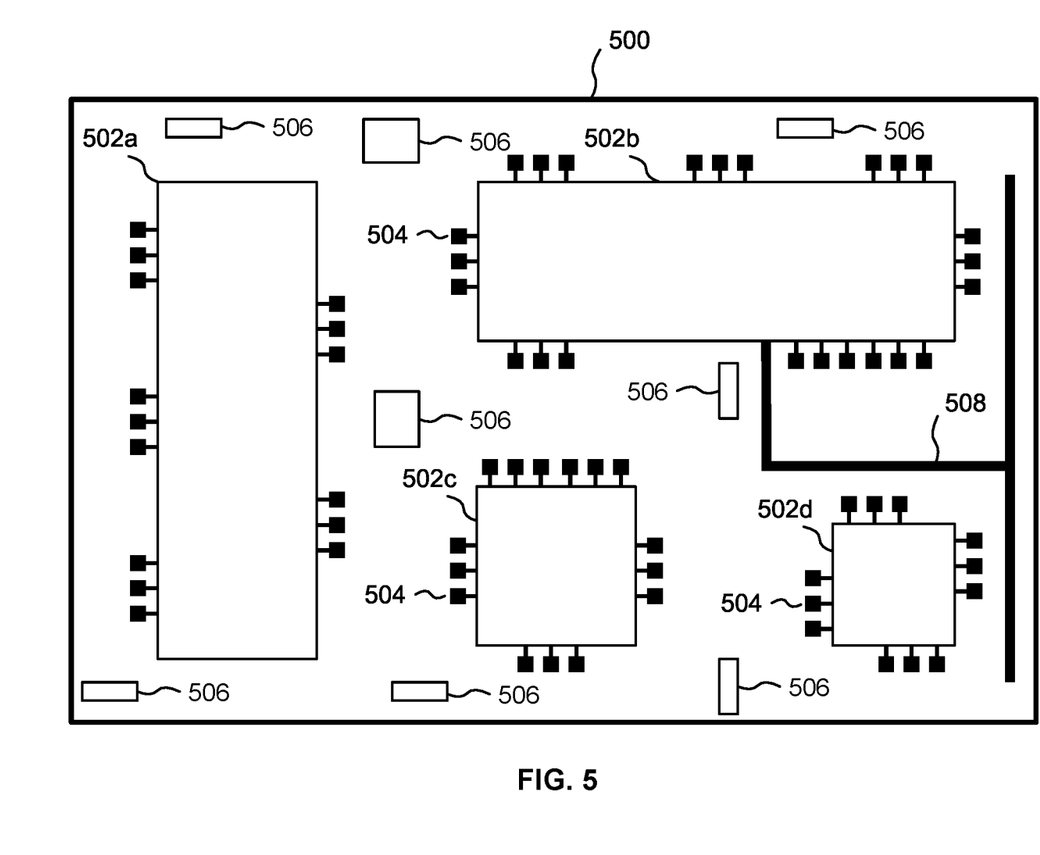
FIG. 5 is a top plan view of a substrate that may be, for example, a printed circuit board or chip module substrate (e.g., a thin-film tile).

As one example of further integration of embodiments of the present invention with other components, FIG. 5 is a top plan view of a substrate 500 that may be, for example, a printed circuit board or chip module substrate (e.g., a thin-film tile). In the illustrated example, the substrate 500 includes multiple ICs 502a-502d having terminal pads 504 which would be interconnected by conductive vias and/or traces on and/or within the substrate 500 or on the opposite (back) surface of the substrate 500 (to avoid clutter, the surface conductive traces are not shown and not all terminal pads are labelled). The ICs 502a-502d may embody, for example, signal switches, active filters, amplifiers (including one or more LNAs), and other circuitry. As just one example, IC 502b may incorporate one or more instances of an LDO 202 or linear regulator 402 having a rapid charge transfer circuit 220 like the circuits shown in FIGS. 2 and 4.

The substrate 500 may also include one or more passive devices 506 embedded in, formed on, and/or affixed to the substrate 500. While shown as generic rectangles, the passive devices 506 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 500 to other passive devices 506 and/or the individual ICs 502a-502d.

The front or back surface of the substrate 500 may be used as a location for the formation of other structures. For example, one or more antennae may be formed on or affixed to the front or back surface of the substrate 500; one example of a front-surface antenna 508 is shown, coupled to an IC die 502b, which may include RF front-end circuitry. Thus, by including one or more antennae on the substrate 500, a complete radio may be created, such as for use in a cell phone.

System Aspects

LDO circuits that include a leakage current compensation circuit are particularly useful as voltage sources for positive or negative charge pumps, but are also quite useful in applications requiring a regulated voltage output where the current loading may be both very high at times and very low at other times. Embodiments of the leakage current compensation circuit of the present invention also may be applied to other circuits that exhibit source-to-drain leakage current.

Embodiments of the present invention are also useful in a wide variety of other circuits and systems for performing a range of functions. Such functions are useful in a variety of applications, such as radar systems (including phased array and automotive radar systems), radio systems (including cellular radio systems), and test equipment. Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 4G, 6G, and WiFi (e.g., 802.11a, b, g, ac, ax, be), as well as other radio communication standards and protocols.

Methods

Figure 6:
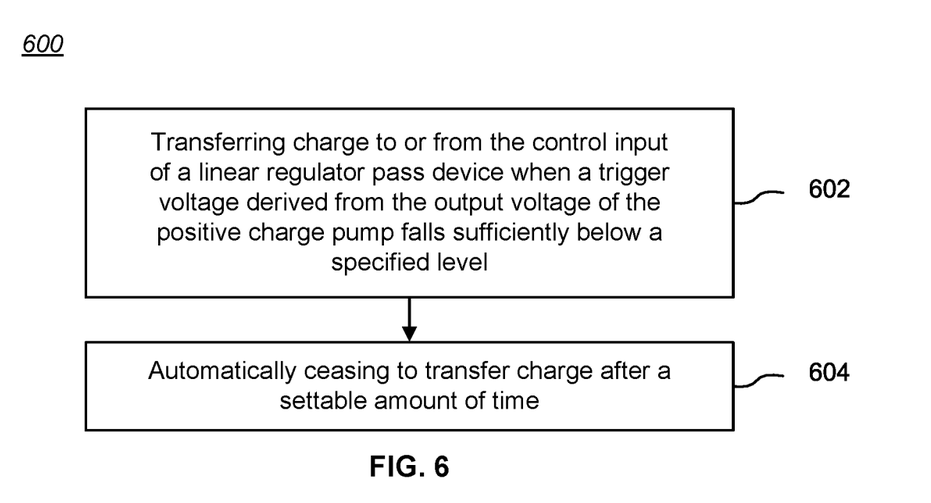
FIG. 6 is a process flow chart showing one method for compensating for fast detection of diminished output voltage of a positive charge pump and for discharge of accumulated charge on a control node of a low-dropout regulator.

Another aspect of the invention includes methods compatible with the disclosed circuit embodiments. For example, FIG. 6 is a process flow chart 600 showing one method for compensating for fast detection of diminished output voltage of a positive charge pump and for control of charge on a control node of a linear regulator. The method includes: transferring charge to or from the control input of the linear regulator pass device when a trigger voltage derived from the output voltage of the positive charge pump falls sufficiently below a specified level [Block 602]; and automatically ceasing to transfer charge after a settable amount of time [Block 604]. As should be clear, this general method may be adapted for use with and to utilize the specific circuits described in this disclosure, including linear regulators having either PFET or NFET pass devices.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. An improved circuit configured to provide a load current to a positive charge pump, including:
   (a) a linear regulator having a pass device that includes a control input; and
   (b) a rapid charge transfer circuit including (1) a current mirror coupled between the control input of the pass device and a reference potential, and (2) a transistor device configured to be coupled to a supply voltage and coupled to the current mirror, wherein a control input of the transistor device is configured to be coupled to a source of a trigger voltage derived from the output of the positive charge pump, the rapid charge transfer circuit configured to (1) transfer a charge between the control input of the pass device and the reference potential through the current mirror when the trigger voltage applied to the control input of the transistor device falls sufficiently below a specified level so as to allow current to flow through the transistor device and the current mirror, thereby rapidly placing the pass device in a higher conduction state, and (2) automatically cease to transfer the charge after a settable amount of time.

2. The invention of claim 1, wherein the linear regulator is a low-dropout regulator.

3. The invention of claim 1, wherein the rapid charge transfer circuit includes a transient coupling circuit configured to be coupled to the source of the trigger voltage and coupled to the control input of the transistor device.

4. The invention of claim 3, wherein the transient coupling circuit includes a high-pass filter.

5. The invention of claim 1, wherein the rapid charge transfer circuit includes a high-pass filter having a capacitor coupled between the source of the trigger voltage and a node, and a resistor coupled between the node and the supply voltage.

6. The invention of claim 5, wherein the settable amount of time is set by an RC time constant of the high-pass filter.

7. The invention of claim 1, wherein the linear regulator includes a compensation circuit coupled to the control input of the pass device.

8. An improved circuit configured to provide a load current to a positive charge pump, including:
   (a) a linear regulator having a PFET pass device that includes a control input;
   (b) a rapid charge transfer circuit coupled to the control input of the PFET pass device and configured to be coupled to a source of a trigger voltage derived from the output of the positive charge pump, the rapid charge transfer circuit configured to transfer a charge to or from the control input of the PFET pass device when the trigger voltage falls sufficiently below a specified level so as to rapidly place the PFET pass device in a higher conduction state, and to automatically cease to transfer the charge after a settable amount of time, wherein the rapid charge transfer circuit further includes:
      (1) a high-pass filter configured to be coupled between the trigger voltage and a supply voltage;
      (2) a P-type MOSFET including a source coupled to the supply voltage, a gate coupled to the high-pass filter, and a drain; and
      (3) a current mirror including an input coupled to the drain of the P-type MOSFET and an output coupled to the control input of the pass device.

9. The invention of claim 8, wherein the high-pass filter includes a capacitor coupled between the source of the trigger voltage and a node, and a resistor coupled between the node and the supply voltage.

10. The invention of claim 9, wherein the gate of the P-type MOSFET is coupled to the node of the high-pass filter.

11. The invention of claim 8, further including a clamp circuit coupled to the supply voltage and coupled between the high-pass filter and the gate of the P-type MOSFET.

12. The invention of claim 8, wherein the current mirror includes an input FET coupled to the drain of the P-type MOSFET, and an output FET coupled to the control input of the pass device, wherein the gates of the input FET and the output FET are connected.

13. The invention of claim 12, wherein the input FET and the output FET are N-type MOSFETs.

14. An improved circuit configured to provide a load current to a positive charge pump, including:
   (a) a linear regulator having an NFET pass device that includes a control input;
   (b) a rapid charge transfer circuit coupled to the control input of the NFET pass device and configured to be coupled to a source of a trigger voltage derived from the output of the positive charge pump, the rapid charge transfer circuit configured to transfer a charge to or from the control input of the NFET pass device when the trigger voltage falls sufficiently below a specified level so as to rapidly place the NFET pass device in a higher conduction state, and to automatically cease to transfer the charge after a settable amount of time, wherein the rapid charge transfer circuit further includes:
      (1) a high-pass filter configured to be coupled between the trigger voltage and a supply voltage; and
      (2) a P-type MOSFET including a source coupled to the supply voltage, a gate coupled to the high-pass filter, and a drain coupled to the control input of the pass device.

15. The invention of claim 14, wherein the high-pass filter includes a capacitor coupled between the source of the trigger voltage and a node, and a resistor coupled between the node and the supply voltage.

16. The invention of claim 15, wherein the gate of the P-type MOSFET is coupled to the node of the high-pass filter.

17. The invention of claim 14, further including a clamp circuit coupled to the supply voltage and coupled between the high-pass filter and the gate of the P-type MOSFET.

* * * * *